US Patent  [19]  [11] Patent Number: 4,677,349
Ruby  [45] Date of Patent: Jun. 30, 1987

[54] SELF CONVERGING DEFLECTION YOKE FOR IN-LINE GUN COLOR CRT

[75] Inventor: Joseph H. Ruby, Glendale, Ariz.

[73] Assignee: Sperry Corporation, New York, N.Y.

[21] Appl. No.: 846,406

[22] Filed: Mar. 31, 1986

[51] Int. Cl.[4] .................. H01J 29/70; H01J 29/76
[52] U.S. Cl. .................................................. 315/368
[58] Field of Search ..................... 315/368, 371, 370

[56] References Cited

U.S. PATENT DOCUMENTS 3,613,109 10/1971 Jarosz ................................. 315/368
3,784,869 1/1974 Takahashi .......................... 315/368
3,849,696 11/1974 Peter et al. ........................ 315/368

Primary Examiner—Theodore M. Blum
Attorney, Agent, or Firm—Arnold L. Albin

[57] ABSTRACT

An apparatus for applying convergence corrections to correct positional and misconvergence errors in a CRT employing a self-converging deflection yoke for magnetic deflection of an inline color gun assembly. Convergence correction coil windings are coupled to the deflection windings with the inductances and resistances of the convergence windings selected to match the time constants of the associated deflection windings. The applied deflection current signals are thereby apportioned between the deflection and convergence coils to modify the beam deflection and provide a beam deflecting flux proportional to the commanded deflection signals and a beam deflection center that is independent of the pattern written on the screen. The resulting currents in the deflection coils and convergence coils are a substantial replica of the commanded deflection current signal waveforms.

6 Claims, 8 Drawing Figures

SELF CONVERGING DEFLECTION YOKE FOR IN-LINE GUN COLOR CRT

BACKGROUND OF THE INVENTION

1. Field of the Invention

The present invention relates generally to the correction of convergence errors created in a CRT employing magnetic deflection of the electron beam, and more particularly to the correction of positional and misconvergence errors in an in-line gun assembly with a self-converging deflecting yoke structure. The invention is particularly adapted to systems which must display information in raster format and/or stroke written format, the latter particularly being degraded if convergence control such as provided by the present invention is not employed.

2. Description of the Prior Art

In the color CRT art, three separate beams are generated by discrete electron guns and focused on a shadow mask disposed on the interior surface of the CRT viewing screen. The beam triad passes through a plurality of pin holes in the mask and then diverges to energize adjacent dot triads of red, green and blue phosphors to provide corresponding color emissions from the face of the CRT. Convergence is said to occur when each of the three electron beams lands on its respective colored phosphor dot of a given phosphor triad for each triad over the entire face of the viewing screen.

For the commonly used delta type electron gun, the three guns are arranged in a triangular configuration and inclined to converge at a central point in the viewing screen. A magnetic deflection yoke is configured to provide a uniform deflection field. Misconvergence is accordingly corrected with extra circuitry, such as disclosed by Carl L. Chase, et al, in U.S. Pat. No. 4,385,259, issued May 24, 1983, Dynamic Convergence Control Apparatus for Shadow Mask CRT Displays, assigned to the assignee of the present invention, and which applies a convergence correction current to the deflection yoke dependent on the beam position. The most critical aspect of deflection yoke design for the delta configuration is a disposal of the windings to establish a uniform magnetic field throughout the region occupied by the scanning beam. The deflection yoke generally consists of two pairs of coils wound at right angles to each other and oriented along the beam axis. Two opposing coils are series connected so that their magnetic fields add. The magnetic lines of flux are oriented horizontally to cause vertical deflection, since the resulting deflection of the electron beam is at right angles to the magnetic lines of flux. A horizontal deflection is produced by the opposing pair of coils whose magnetic lines of flux pass vertically through the neck of the tube.

A simpler approach is that of arranging the electron guns in a linear array to provide substantially converging electron beams at the center of the viewing screen and shaping the deflection coil to provide inherent convergence control by providing a non-uniform deflection field. This technique requires critical alignment of the deflection yoke on the neck of the CRT, along with permanent magnets which may be statically trimmed for optimum convergence correction at the center of the face of the CRT. The misconvergence in one plane can be reduced substantially to zero by deliberately introducing an astigmatic deflection of the magnetic fields into the deflection yoke design. For example, for a vertical gun array, the horizontal field is arranged to provide a barrel shaped deflection and the vertical field to provide a pin cushion deflection. When the resultant magnetic fields are combined, the three electron guns can be substantially converged to a single line at any point at the face of the CRT screen. Thus, convergence correction need be addressed only to a single plane.

To realize the required astigmatic magnetic field distribution on a production basis, the yoke must be wound with a high degree of precision. In one embodiment, each turn of wire is precisely placed into the winding grooves of molded plastic rings that are cemented to each end of a toroidal core. Optimum convergence is then achieved by positioning the yoke in relation to the picture tube neck to properly align the three beams with the center of deflection of the yoke.

A further improvement in the art utilizes a deflection yoke coupled to a convergence coil which is adjustable to minimize misconvergence. However, it has been found that significant positional and misconvergence errors remain uncorrected, particularly with respect to stroke writing displays.

The present invention overcomes the shortcomings of the prior art by an improved CRT convergence circuit design which yields substantial production interchangeability without the need for dynamically modifying the deflection amplifier waveforms, by providing individual adjustment of the convergence network inductance and resistance to match the L/R time constants.

SUMMARY OF THE INVENTION

The present invention provides deflection positional and convergence correction to a cathode ray tube convergence system of the type including a magnetically deflected color cathode ray tube with a viewing screen for displaying a pattern written thereon by a plurality of electron beam sources. The electron beam sources are arranged in a plane and disposed to converge the electron beams at the center of the viewing screen. The system includes a deflection yoke with horizontal and vertical deflection windings to deflect the electron beams in accordance with a commanded deflection signal. The yoke also acts to converge the electron beams on a focal plane coincident with the viewing screen. Coupled to the deflection yoke and responsive to at least a portion of the commanded deflection signal is convergence means comprised of convergence coil windings. At least one impedance parameter of the windings of the convergence coil is independently adjustable and selected to provide a predetermined impedance ratio with respect to predetermined impedance parameters of the deflection windings. The applied deflection signals are thereby apportioned between the deflection and convergence coils to provide a beam deflecting flux proportional to the command deflection signal and a beam deflection center that is independent of the pattern written on the screen. The resulting currents in the deflection windings and convergence windings are linearly proportional to the commanded deflection signal waveforms.

In a preferred embodiment, a plurality of convergence windings have a mutually coupled variable self-inductance and are provided with independently adjustable series resistances whereby the time constants of the associated deflection and convergence coils are made equal.

Circuits for both series connected and parallel connected deflection coils are provided.

BRIEF DESCRIPTION OF THE DRAWINGS

The accompanying drawings illustrate a preferred embodiment of the present invention wherein.

DESCRIPTION OF THE PREFERRED EMBODIMENT

Figure 1:
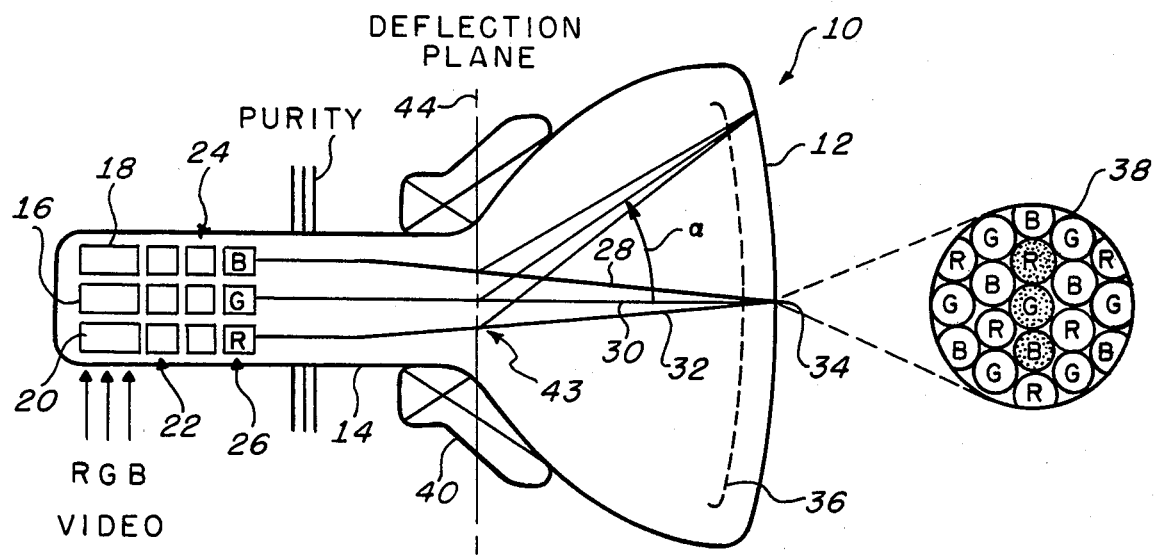
FIG. 1 is a schematic cross-section of a typical in-line color CRT of a shadow mask type.

Referring now to FIG. 1, a schematic cross section of a typical color CRT of the shadow mask type is illustrated. It comprises a glass envelope 10 including a viewing surface 12 with a cylindrical neck 14. Conventionally mounted within the envelope 10 are three color CRT electron guns 16, 18 and 20. Electrodes 22, 24 and 26 focus the electron beams 28, 30 and 32 nominally at the center 34 of the viewing face 12. At the viewing surface of the envelope 10 is a shadow mask 36 which comprises a metallic plate with a matrix of small holes. The internal surface of the faceplate of the CRT is provided with a corresponding matrix of red, green and blue phosphor dots, G, R, B as illustrated at 38. A deflection yoke 40 is affixed to the envelope 10.

The beams 28, 30, 32 are deflected in accordance with horizontal and vertical deflection control signals by means of the magnetic fields produced by coils in conventional deflection yoke 40 and have an effective deflection plane 44. These signals may provide raster displays or stroke written displays or a combination of both by conventional techniques.

The three electron guns 16, 18, 20 may conventionally be arranged in a linear array to illuminate the viewing screen on a horizontal or vertical line, as shown at 38 by shaded areas G, R, B. Since the electron beams are disposed along a finite width, the outer beams 28 and 32 enter the magnetic field of the deflection yoke at different angles and may be aligned to converge on the phosphor screen at its center 34. However, when the three beams are deflected at an angle $\alpha$, they do not converge on their reflective colored phosphor dots at the new triad position, resulting in color fringing.

It is known to one skilled in the art that the deflection flux density and therefore the position of the electron beams is proportional to the sum of the currents in the deflection windings. The center of deflection of the yoke, which is the apparent geometric point 43 through the deflection plane 44 at which the electron beams are angularly displaced, is proportional to the ratio of the currents in the deflection windings, and may be varied a small amount to introduce a convergence correction, since the flux density across the in-line beams is not uniform, and therefore the bending influence on an individual beam will be dependent on its displacement from the yoke center. Such a convergence correction may be introduced by electrically connecting each deflection winding to a corresponding convergence inductor with a series resistor for the axis along which the error correction is required, as in FIG. 2. In the prior art, the inductors $L_{CU}$ and $L_{CL}$ were mutually coupled, as were series resistances $R_{CUS}$ and $R_{CLS}$. By suitably adjusting the impedance parameters of the convergence winding inductances and series resistances, a predetermined current may be diverted from the deflection winding coupled thereto. If the corrective current is small, say of the order of 5 percent or less of the deflection current, the deflection sensitivity will not be materially reduced, and the current ratios of the deflection coils may be adjusted for optimal convergence over the viewing face of the cathode ray tube.

It has been found, however, that the theoretical advantages of the aforesaid yoke and convergence coil structure are not fully achieved for a stroke-writing display system. While the above configuration is suitable for raster displays, which employ repetitive waveforms, use with stroke vector displays results in significant positional and convergence errors. The positional error is due to distortion of the deflection waveform, and misconvergence error is due to a shifting of the yoke deflection center as a result of the current being supplied to the convergence coils, which unbalances current through the deflection coils. These errors are particularly critical in stroke writing systems, where it is found that the positional error and convergence error are stroke pattern dependent.

Figure 2:
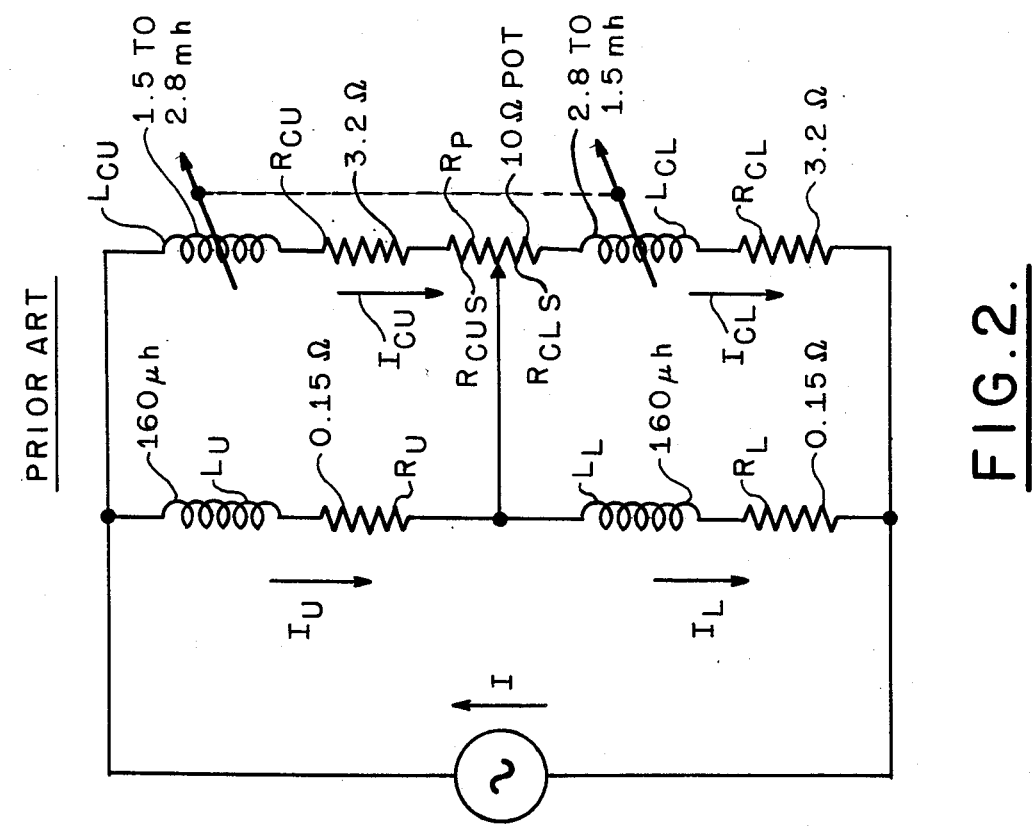
FIG. 2 is an electrical schematic diagram of a prior art series-connected self-converging yoke and convergence coil.

Referring now to FIG. 2, there is shown a schematic circuit of a self-converging deflection yoke of the prior art which may be utilized for either horizontal or vertical deflection. In the example shown, a first branch comprises an upper deflection yoke coil $L_U$ series connected with a lower deflection yoke coil $L_L$. Each coil typically has an inductance value of 160 $\mu$h. Inherent in the coil structure is a series resistance, which is typically of the order of 0.15 ohms per coil. A second branch, comprised of upper convergence coil $L_{CU}$ and lower convergence coil $L_{CL}$, has an adjustable potentiometer $R_p$ interposed between the convergence coils, with the adjustable tap of the potentiometer coupled to the common point of the series connected deflection coils $L_U$ and $L_L$. Convergence coils $L_{CU}$ and $L_{CL}$ have associated series resistances $R_{CU}$ and $R_{CL}$, respectively, of 3.2 ohms nominal. The convergence coils are coupled on a common core so as to provide an inductance adjustable in the range of 1.5 to 2.8 mh. The coils preferably are mutually coupled so that an increase in the inductance of the first coil results in a decrease in inductance of the second coil, and vice versa. The variable inductances and potentiometer permit adjusting the convergence of the electron beam for production yokes and production CRTs to correct for small tolerances and variances in electron beam direction; however, it has been found that optimum convergence for stroke displays cannot be obtained.

Figure 3:
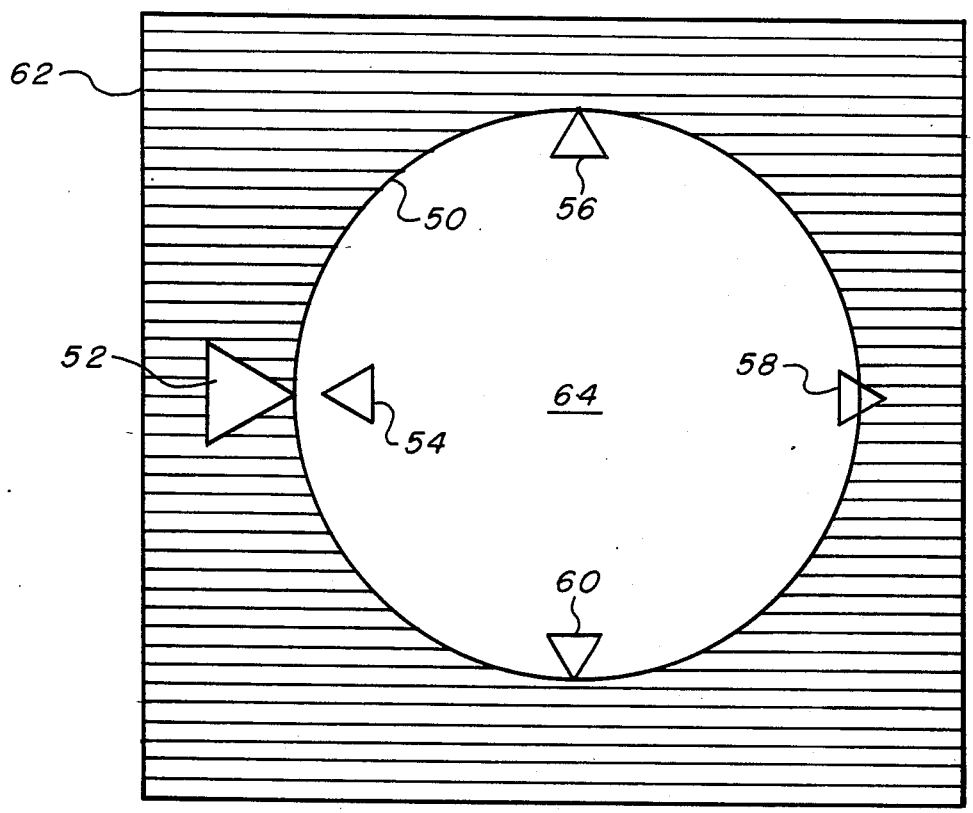
FIG. 3 is a view in elevation of a CRT face, illustrating the stroke pattern dependent positional error.
Figure 4:
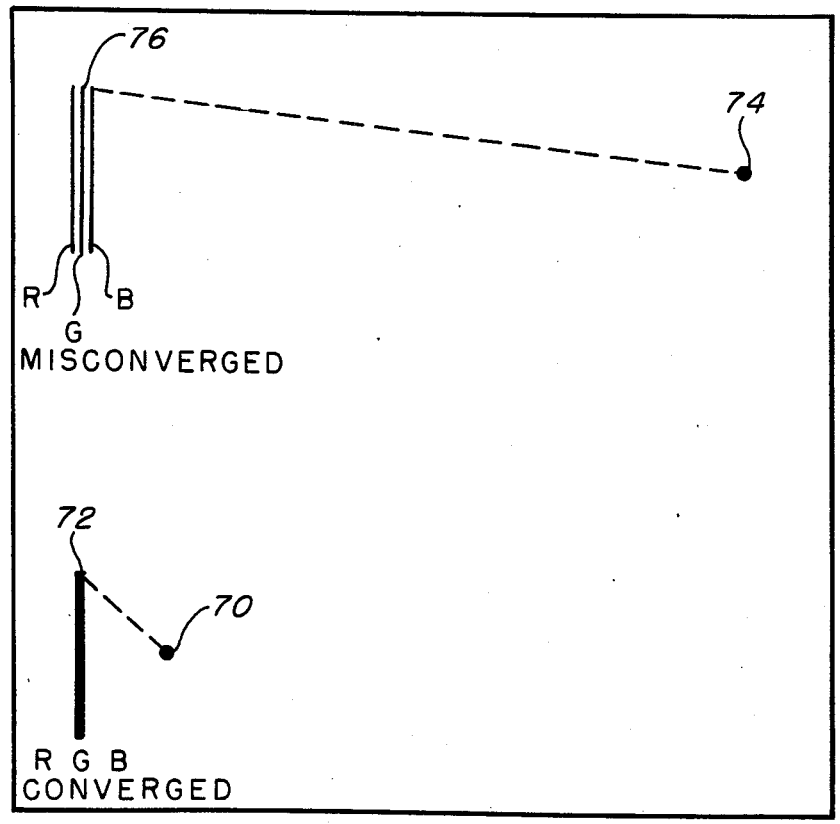
FIG. 4 is a view in elevation of a CRT face showing a stroke pattern dependent misconvergence.

Examples of the type of convergence errors of the prior art structure are shown in FIGS. 3 and 4. FIG. 3 shows the face of a CRT on which a stroke written pattern for use in a navigational display is provided.

Stroke written circle 50, index 52, and markers 54, 56, 58 and 60 are displayed on a two color raster background 62, 64. It is desired that the apex of the markers 54–60 should fall on the circle 50. However, it is seen that markers 54 and 58 are displaced from their desired positions.

FIG. 4 shows an example of a stroke pattern dependent convergence error that was observed. A beam at an initial position 70 was blanked and deflected to position 72, a short distance therefrom. The resultant display at 72 was found to be properly converged. However, when the beam was deflected a relatively large distance from an initial position 74 to say, position 76, the red, green and blue beams were found to be misconverged, resulting in a visible fringe about the desired color image.

The present invention corrects the above-described undesirable results by independently matching the RL time constants of the yoke windings with the corresponding time constants of the cooperative convergence coil windings, so that the beam deflecting flux density will be proportional to the commanded deflection current and the beam deflection center will be a constant, independent of frequency and deflection current signal waveforms, and results in proportioning the current signals in the deflection coils so that they are representative of the deflection current signal waveforms.

Figure 5:
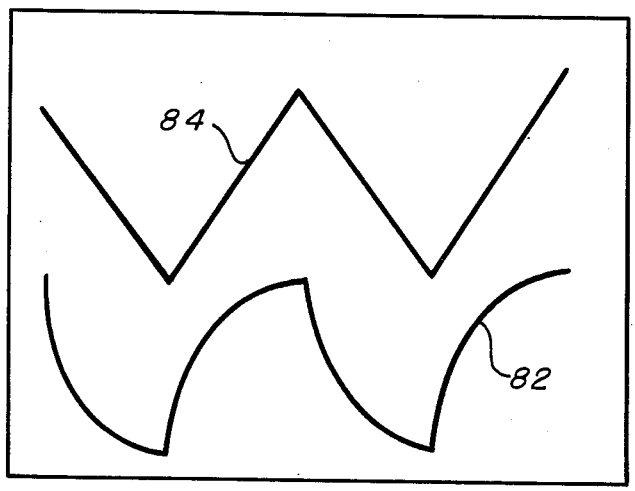
FIG. 5 illustrates current waveforms for the applied input current signal and the corresponding deflection coil current in a misconverged condition.
Figure 6:
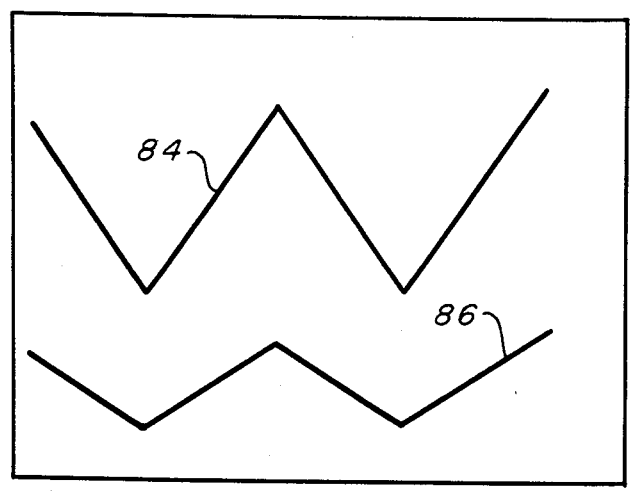
FIG. 6 shows the input signal current waveform and corresponding deflection coil current waveform of the tuned convergence compensation windings of the present invention.

The effectiveness of this technique may be seen by referring to FIGS. 5 and 6. FIG. 5 shows current waveforms applied to a prior art self converging deflection yoke and convergence network of the type illustrated in FIG. 2. Waveform 84 is a sawtooth representative of an applied deflection current. Waveform 82 shows the resultant current through the convergence network with waveform distortion readily apparent as a result of the divergence of current to the convergence coil.

In FIG. 6, representative of the circuit in FIG. 7, waveform 84 is again the applied input current, while waveform 86 shows the corresponding convergence coil current. Note that waveform 86 is linearly proportional to waveform 84 and may be readily scaled by a suitable gain factor to provide the desired peak deflection. The figures illustrate the effectiveness of the present invention in correcting errors in misconvergence and beam center displacement.

Referring again to FIG. 2, to obtain the beneficial advantages of the present invention, the time constant ratio $L_U/R_U$ of the upper deflection coil must be matched to the time constant ratio $L_{CU}/(R_{CU}+R_{CUS})$ of the upper convergence coil, and the time constant $L_L/R_L$ of the lower deflection coil must be matched to the time constant $L_{CL}/(R_{CL}+R_{CLS})$ of the lower convergence coil. It should be noted that in the prior art self-converging yoke, as denoted by the dashed line, the inductors $L_{CU}$ and $L_{CL}$ are mutually dependent, as are the series resistances $R_{CUS}$ and $R_{CLS}$, which are determined by the position of the wiper arm on the potentiometer $R_p$. Thus, the prior art is incapable of matching the time constants over a relatively wide range of ±4% since this requires the capability of independently adjusting at least the series resistors $R_{CUS}$ and $R_{CLS}$ or the inductors $L_{CL}$ and $L_{CU}$.

Figure 7:
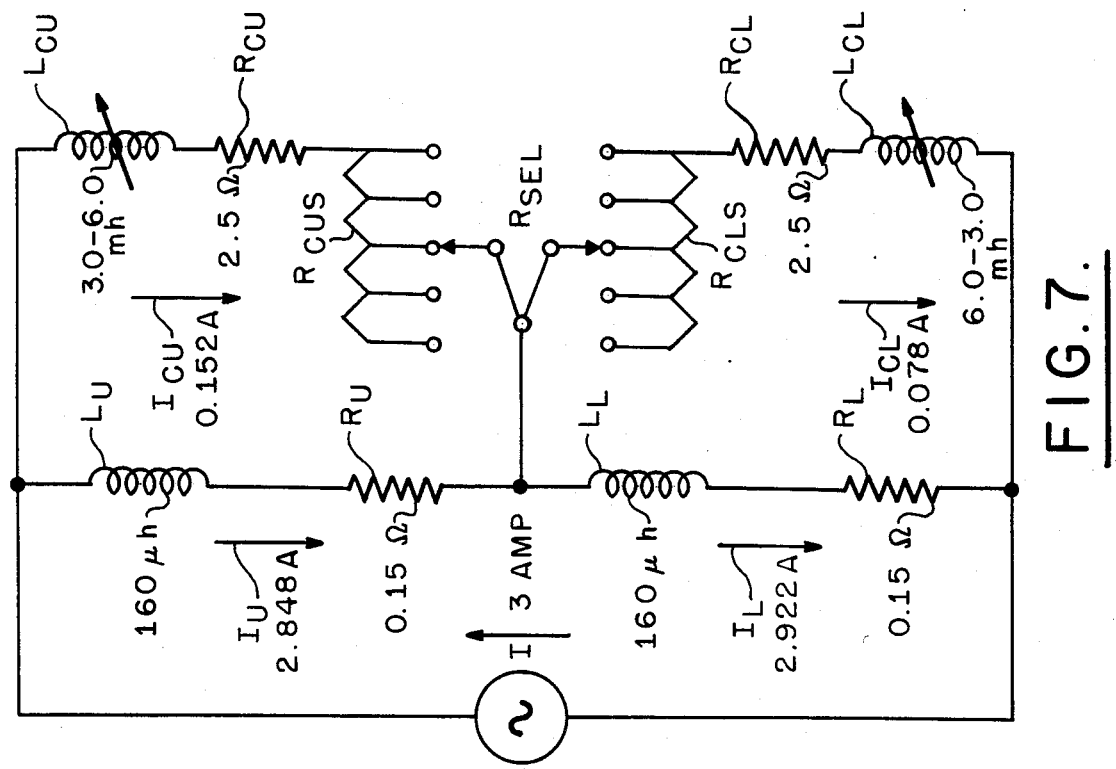
FIG. 7 illustrates a schematic circuit of a series connected self-converging yoke of the present invention.

Referring now to FIG. 7, which illustrates an embodiment of the present invention, in order to eliminate the positional error, one must be able independently to set the current ratios in the upper and lower current loops. Hence, the following relationship must be satisfied. The position of the beam is proportional to:

$$I_U + I_L = k_1 \cdot I \qquad (1)$$

where I is the commanded deflection current, and $k_1$ is a constant independent of current, time, frequency, stroke display pattern or raster display pattern, determined by the desired fraction of current in the deflection yoke to effect convergence correction.

Further, in order to eliminate the convergence error, the convergence of the beam is proportional to:

$$I_U/I_L = k_2 \qquad (2)$$

where $k_2$ is a constant.

When the time constants of the upper deflection coil ($L_U/R_U$) and the associated convergence coil $L_{CU}/(R_{CU}+R_{CUS})$ are equal, then it may be shown that $$I_{CU}/I_U = L_U/L_{CU} = R_U/(R_{CU}+R_{CUS}) \qquad (3)$$

Since the inductance values may be predetermined and are independent of frequency, the percentage of current that is diverted from the deflection yoke to the convergence coil is also independent of frequency. Thus, the current division ratio (3) will not depend on the stroke pattern that is displayed on the CRT. Further, for equal time constants, $R_{CUS}$ is adjusted so that $$I_{CU}/I_U = R_U/(R_{CU}+R_{CUS}) \qquad (4)$$

where $R_{CUS}$ is the external series resistance in ohms associated with the upper convergence coil $L_{CU}$.

Thus, it is seen that the current division ratio is independent of applied frequency, and hence of the waveform.

In a similar manner, the currents $I_L$ and $I_{CL}$ in the lower section of the deflection coil and convergence coil will also be proportioned in accordance with the inductance ratios and series resistance ratios, independently of frequency, so long as the time constants of the lower network loop are matched, so that:

$$I_{CL}/I_L = L_L/L_{CL} \qquad (5)$$

and $$I_{CL}/I_L = R_L/(R_{CL}+R_{CLS}) \qquad (6)$$

The values shown in FIG. 7 are exemplary and not to be construed as limiting. For simplicity, a symmetrical circuit is shown; however, the same principles apply where the convergence misalignment requires differing values of correction in the upper and lower sections of the network.

In operation, a time varying current of arbitrary waveform with a peak value of ±3 amp. is assumed to be provided by the deflection amplifier. In practice, it has been found that a ±5 percent adjustment of the deflection yoke current ratio $I_U/I_L$ provides an adequate range of convergence correction for a particular CRT and yoke combination. By selectively connecting one or both of two convergence coil windings to a corresponding deflection coil winding, the desired range may be achieved with an inductance variable over only a 2:1 range, which is not difficult to construct. Thus, using the values of FIG. 7, when both convergence windings are utilized, the impedances may be varied to provide a current ratio reduction of ±2.6%. Using only the top convergence coil winding the range of +2.6% to 5.0% is obtained, while using only the bottom convergence coil winding will provide a range of −2.6% to −5.0%.

For example, calculate the current ratio range that can be achieved with both convergence networks connected and the inductors set to provide the maximum ratio range. This is preferably obtained by mutually coupling the convergence coils so that one inductor is at a maximum value while the other is at a minimum value. From equation (3) and choosing an inductance value of 3.0 mh for the upper convergence coil, the series resistance $R_{CU}+R_{CUS}$ is seen to have a value of $$R_{CU}+R_{CUS}=3(0.15)/0.16=2.8125 \text{ ohm} \quad (7)$$

Since the selected inductor has a typical winding resistance of 2.5 ohm, an additional series resistance $R_{CUS}$ of 0.3125 ohm is required. This is provided by adjusting the wiper of switch $R_{SEL}$ to provide an appropriate resistance at resistor network $R_{CUS}$. This results in a branch current of 2.848 amps in $L_U$.

Selecting a value of 3.0 mh for the upper convergence coil $L_{CU}$ results in a value of 6.0 mh for the lower convergence coil $L_{CL}$ because of the mutual coupling between $L_{CU}$ and $L_{CL}$. Substituting in equation (5) yields:

$$I_{CL}/I_L = \frac{.16 \times 10^{-3}}{6 \times 10^{-3}} = 0.02667 \quad (10)$$

Therefore, from equation (6):

$$I_{CL}/I_L=R_L/(R_{CL}+R_{CLS})=0.02667 \quad (11)$$

from which $$R_{CL}+R_{CLS}=0.15/0.02667=5.625 \text{ ohm} \quad (12)$$

Since $R_{CL}$ has a predetermined value of 2.5 ohm, $$R_{CLS}=5.625-2.5=3.125 \text{ ohm} \quad (13)$$

This results in a branch curent of 2.922 amp in $L_L$. The ratio of currents in the upper and lower deflection yoke coils is found from:

$$\frac{I_U}{I_L} = \frac{(L_{CL}+L_L)L_{CU}}{(L_{CU}+L_U)L_{CL}} \quad (14)$$

The foregoing equation is valid when both upper and lower convergence networks are connected and the time constants are matched to the associated deflection coils.

Substituting in (14) yields:

$$\frac{I_U}{I_L} = \frac{(6.0+0.16)3}{(3.0+0.16)6} = 0.9747 \quad (15)$$

This is the desired result of reducing the current ratio of the upper and lower deflection windings by 2.5%. Similarly, a +2.5 increase in $I_U/I_L$ could be obtained by adjusting $L_{CU}$ to its maximum value of 6 mh and readjusting $R_{CUS}$ and $R_{CUL}$ to match the deflection coil time constants.

It is a sufficient condition that the upper loop convergence network time constant be matched to the predetermined time constant value of the upper yoke half and the lower loop convergence network time constant matched to the time constant of the lower yoke half. The time constants of the two yoke halves need not be equal. Thus, $$\text{UPPER} = \frac{L_U}{R_U} = \frac{L_{CU}}{(R_{CU}+R_{CUS})} \quad (16)$$

$$\text{LOWER} = \frac{L_L}{R_L} = \frac{L_{CL}}{(R_{CL}+R_{CLS})} \quad (17)$$

$$\text{Hence,} \frac{L_U}{R_U} = \frac{160 \times 10^{-6}}{0.15} = 1.07 \times 10^{-3} \quad (18)$$

$$\frac{L_{CU}}{R_{CU}+R_{CUS}} = \frac{3.00 \times 10^{-3}}{2.8125} = 1.07 \times 10^{-3} \quad (19)$$

$$\frac{L_L}{R_L} = \frac{L_U}{R_U} = 1.07 \times 10^{-3} \quad (20)$$

$$\frac{L_{CL}}{R_{CL}+R_{CLS}} = \frac{6 \times 10^{-3}}{5.624} = 1.07 \times 10^{-3} \quad (21)$$

It may be seen from these results that the time constants are matched in the upper current loops and are also matched in the lower current loops. Note that the time constants of the deflection coils and convergence coils could still be matched, but to different values in the upper and lower sections, if the upper yoke inductance $L_U$ has a different value than the lower yoke inductance $L_L$. Equation (1) and equation (2) are satisfied, and the desired deflection signal waveform of FIG. 6 is obtained, overcoming the positional error and misconvergence error of the prior art that otherwise occurs with random signal waveforms. Changes in the value of $k_1$ and $k_2$ are readily accommodated by adjusting the gain of a conventional deflection amplifier. In the example above, since the current in coil $L_U$ has been reduced relative to the current in $L_L$, the nonuniform field of the conventional inline gun yoke has been shifted upward and thus when used with the inline gun CRT the bottom electron beam (red) will be deflected upward more than the other two beams for the nominal commanded position. This effects the desired convergence correction.

As noted above, the adjustment range can be increased to ±5% by leaving the upper or lower section of $R_{SEL}$ open, thereby disconnecting one convergence coil. For example, if the lower switch is open, and assuming the parameter values shown in FIG. 7, $$I_U=I/(1+L_U/L_{CU})=3.0/(1+0.16/3)=2.848 \quad (22)$$

$I_L=3$, since all applied current flows through $I_L$. Therefore, the current ratio is now 2.848/3=0.949. Thus, a 5% current reduction ratio between the upper and lower deflection coils has been obtained using the minimum inductance of 3 mh. By choosing intermediate values of the inductances up to the maximum value of 6 mh and selectively switching the upper and lower convergence coil windings, the current ratio can be varied over the total range of ±5%. The convergence correction can be precisely trimmed to five percent, or any desired lesser value, by slight adjustments in the series resistors and a corresponding change in the inductors to match the L/R time constants.

Figure 8:
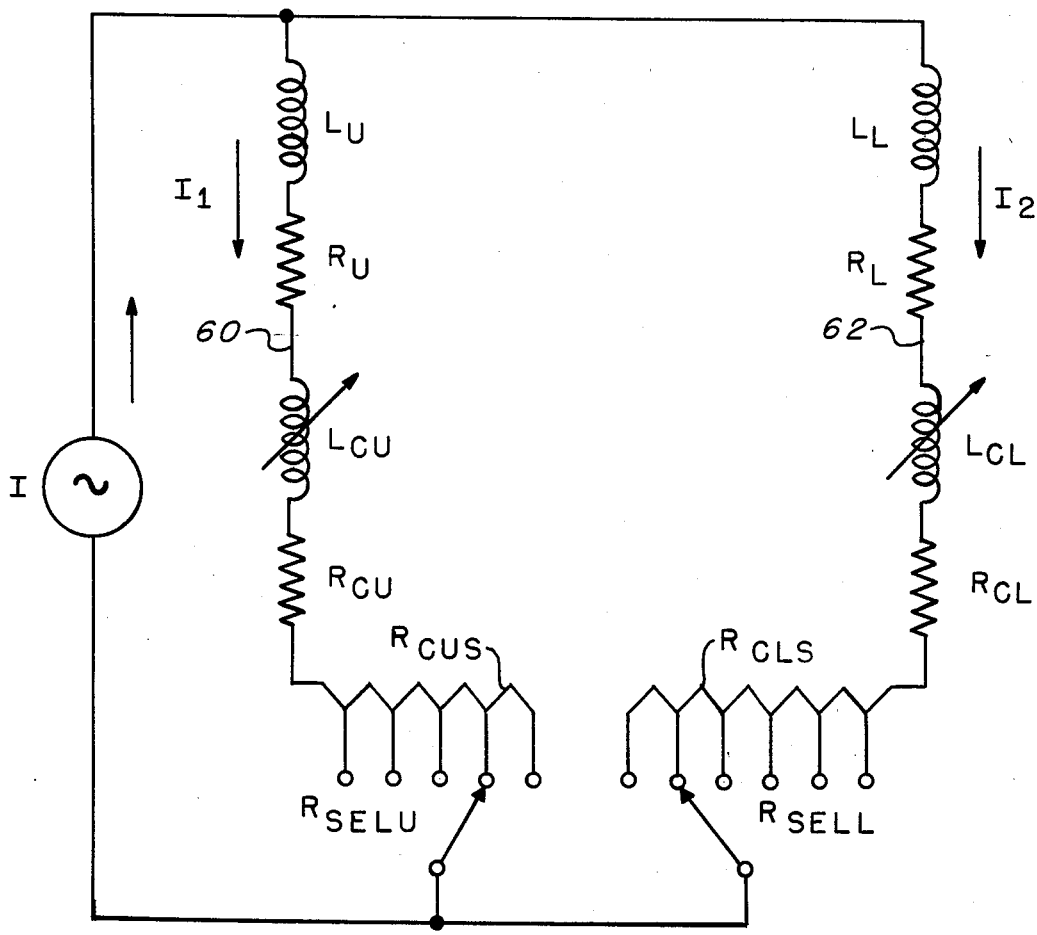
FIG. 8 shows in schematic form a parallel connected self-converging yoke of the present invention.

While the examples heretofore discussed refer to series connected circuits, the same concept is applicable to a parallel circuit. Thus, referring to FIG. 8, the deflection coils comprise a first circuit branch 60, a first deflection yoke half winding $L_U$ with internal resistance $R_U$, series connected with convergence winding $L_{CU}$ and internal resistance $R_{CU}$, and adjustable series resistance $R_{CUS}$. A second branch circuit 62 includes a second deflection yoke half winding $L_L$ with series resistance $R_L$ in series connection with second convergence winding $L_{CL}$, with its series resistance $R_{CL}$ and an adjustable series resistance $R_{CLS}$. The values of parameters $L_U$, $R_U$, $L_L$, and $R_L$ are predetermined in accordance with the normmal deflection sensitivity. The time constant of the left hand branch $$(L_U+L_{CU})/(R_U+R_{CU}+R_{CS})$$

is matched to the time constant of the right hand branch, $$(L_L+L_{CL})/(R_L+R_{CL}+R_{CLS}.$$

Appropriate resistance for the left series element $R_{CUS}$ is provided by the wiper of selector switch $R_{SELU}$. $R_{CUS}$ may also be a potentiometer. Series resistor $R_{CLS}$ is adjusted by the wiper of selector switch $R_{SELL}$. The windings $L_{CU}$ and $L_{CL}$ of the convergence coil may be coupled by mutual inductance, although they may also be independently selected with appropriate circuit components, in which case predetermined series resistors may be used. The parallel branches through which currents $I_1$ and $I_2$ flow are connected to receive the deflection current signal I which is the commanded deflection current.

While the invention has been described in its preferred embodiments, it is to be understood that words which have been used are words of description rather than limitation and that changes may be made within the purview of the appended claims without departing from the true scope and spirit of the invention in its broader aspects.

I claim:

1. Apparatus for providing convergence and deflection positional correction for a plurality of electron beams in a magnetically deflected cathode ray tube having deflection signals applied thereto, comprising:
    a deflection yoke coupled to said cathode ray tube including first and second deflection windings having corresponding first and second inductances and first and second series, resistances respectively, said windings so distributed as to effect substantial convergence of said electron beams at all points on the face of a phosphorescent viewing screen of said cathode ray tube,
    a convergence coil including first and second convergence correction windings and adjustable inductance means to obtain corresponding first and second inductances thereof, and having corresponding first and second series resistances,
    said first and second convergence correction windings having first and second time constants associated therewith, respectively
    means for coupling ones of said deflection windings and ones of said convergence windings to receive at least portions of said deflection signals,
    first adjustble series resistance coupled in series with said first convergence correction winding for adjusting said first time constant without affecting said second time constant, and
    second adjustable series resistance coupled in series with said second convergence correction winding for adjusting said second time constant without affecting said first time constant,
    said adjustments being effected for apportioning said deflection signals between said deflection windings and said convergence windings so as to effect said substantial convergence of said electron beams on a focal plane coincident with said viewing screen and to correct convergence errors of said substantially converged electron beams.

2. The convergence correction apparatus as set forth in claim 1 wherein:
    the quotient of said first inductance and said first series resistance of said first deflection winding defines a third time constant,
    the quotient of said fiirst inductance and said first series resistance of said first convergence correction winding with said first adjustable series resistance defines said first time constant,
    said first adjustable series resistance being adjusted such that said first and third time constants are substantially equal,
    the quotient of said second inductance and said second series resistance of said second deflection winding defines a fourth time constant,
    the quotient of said second inductance and said second series resistance of said second convergence correction winding with said second adjustable series resistance defines said second time constant, and
    said second adjustable series resistance being adjusted such that said second and fourth time constants are substantially equal,
    so that said deflection signals are apportioned between cooperating windings of said deflection yoke and said convergence coil independent of frequency and deflection signal waveforms, and said apportioned deflection signals are linearly representative of said deflection signal waveforms.

3. The convergence correction apparatus as set forth in claim 2, said adjustable inductance means further comprising means for mutually coupling said convergence correction windings to obtain said first and second inductances, said adjustable means providing an increase in said first inductance when said second inductance is decreased, and a decrease in said first inductance when said self inductance is increased.

4. The convergence correction apparatus as set forth in claim 3, wherein said first and second adjustable series resistances are coupled to said first and second series resistances of said first and second convergence correction windings respectively, for defining said first and said second time constants in cooperation with said adjustable inductance means for mutually coupling said correction coils.

5. The apparatus as set forth in claim 4, wherein:
    said first and second deflection windings are connected in series, defining a first common terminal,
    said first and second adjustable series resistances are connected in series, defining a second common terminal coupled to said first common terminal,
    said first deflection winding and said first convergence correction winding with said first adjustable series resistance are coupled in parallel,
    said second deflection winding and said second convergence correction winding with said second adjustable series resistance are coupled in parallel, and means for coupling said deflection signals to said first and second deflection windings.

6. The apparatus as set forth in claim 4, further comprising:
   (a) a first circuit branch including said first deflection winding, said first convergence correction winding, and said first adjustable series resistance connected in series,
   (b) a second circuit branch including said second deflection winding, said second convergence correction winding, and said second adjustable series resistance connected in series,
   (c) said first branch and said second branch are parallel connected, and
   (d) means for coupling said deflection signals to said first and second deflection windings.

* * * * *